Dec. 25, 1928.　　　　　E. DAVIS　　　　　1,696,628

MECHANICAL MOVEMENT

Filed Jan. 6, 1927

INVENTOR.
Ernest Davis.
BY
Ernest Bordell
ATTORNEYS.

Patented Dec. 25, 1928.

1,696,628

UNITED STATES PATENT OFFICE.

ERNEST DAVIS, OF SYRACUSE, NEW YORK, ASSIGNOR TO THE PROSPERITY COMPANY INC., OF SYRACUSE, NEW YORK, A CORPORATION OF NEW YORK.

MECHANICAL MOVEMENT.

Application filed January 6, 1927. Serial No. 159,281.

This invention has for its object a simple and efficient mechanical movement, particularly a movement for continuing to apply power when a crank or the like is at the end of its power stroke or travelling in an arc, the chord of which is at a right angle to the direction of reciprocating movement effected by the crank.

The invention consists in the novel features and in the combinations and constructions hereinafter set forth and claimed.

In describing this invention reference is had to the accompanying drawings in which like characters designate corresponding parts in all the views.

Figure 1:
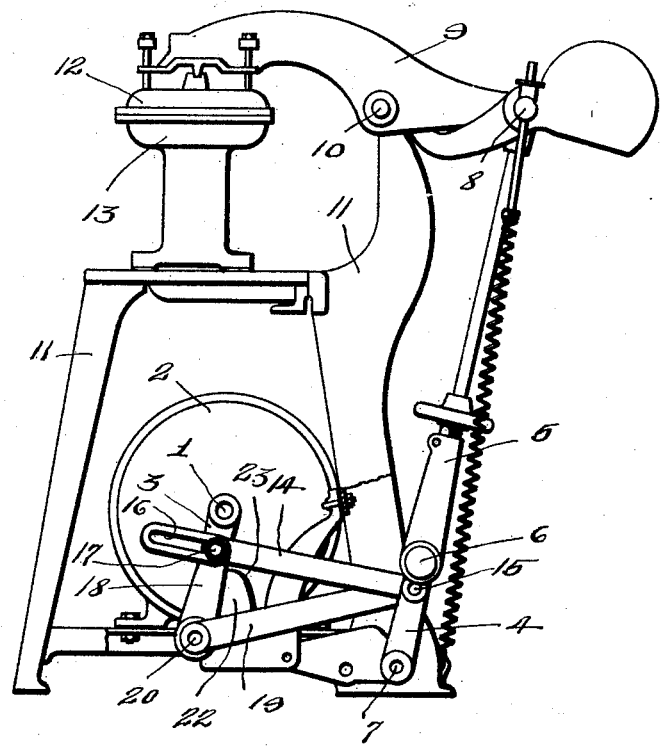
Figure 1 is a side elevation of this mechanical movement, the same being shown as applied to a pressing machine to serve as the actuating mechanism therefor.
Figure 3:
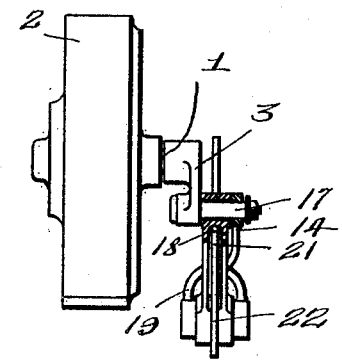
Figure 3 is an edge view looking to the right in Figure 2.

This mechanical movement comprises generally a prime mover movable about an axis and having a crank for translating a rotary or oscillating movement into a reciprocating movement, a driven element, a link connecting the crank and the reciprocating driven element and connections between the prime mover and the driven element to actuate the latter when the crank is at the end of its power stroke or when the crank is reversing its movement, that is when it is passing through an arc, the chord of which is at a right angle to the direction of the reciprocating movement effected or translated by the crank.

The prime mover may be of any suitable form, size and construction. It is here shown as the armature shaft 1 of an electric motor 2, the shaft 1 having a crank or its equivalent means 3 to transfer movement. The driven element is here shown as a toggle consisting of links 4, 5 pivoted together at 6, the links 4 being pivoted at 7 to the frame of a machine such as a pressing machine and the link 5 being pivoted at 8 to the part to which the motion is to be transferred, this part being the rear arm of a yoke lever 9 pivoted at 10 between its ends to the frame 11 of the machine, said yoke carrying at its front end a press head 12 movable toward and from a buck 13 also mounted on the frame 11. In the operation of the machine, the head opens and closes onto the work onto the buck 13 as will be understood by those skilled in the art.

The connection between the prime mover 1 or crank 3 and the toggle consists of a reciprocable link 14 pivoted at 15 to the toggle and being also connected to one of the parts it connects as the crank by a lost motion connection, it being here shown as having a slot 16 extending lengthwise thereof for receiving the crank pin 17.

The additional connection comprises a second link 18 movable with the crank and also relatively thereto and means here shown as a third link 19 connecting the second link 18 and the toggle, these parts having a follower 20 preferably at the joint connecting them, which coacts with the lift portion 21 of a cam 22 so arranged that the follower 20 is carried into engagement with the lift portion of the cam when the link 14 is at the limit of its power stroke, or as the crank is reversing its movement from left to right. The follower 20 engages the lift portion 21 of the cam and pulls the link 19 further to the left and straightens the toggle or further actuates the driven element. The cam 22 is carried by the frame and is provided with a surface 23 for guiding the follower 20 into engagement with the lever surface 21 during the movement of the crank. The link 19 and the link 18 are preferably double and the follower is carried between the arms 18.

The prime mover, in this embodiment of my invention, oscillates and moves nearly one revolution in one direction and then in the opposite direction. As various means for controlling the operation of the electric motor are well known and as such means forms no part of this invention, further as the operation is well known, further description is thought to be unnecessary especially as it is only necessary for an understanding of the present embodiment of this invention to bear in mind that the shaft 1 rotates first in one direction and then in another.

Figure 2:
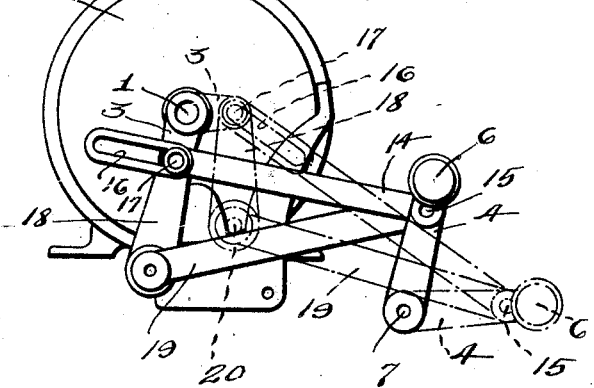
Figure 2 is an enlarged view of the parts of the mechanical movement shown in Figure 1.
Figure 4:
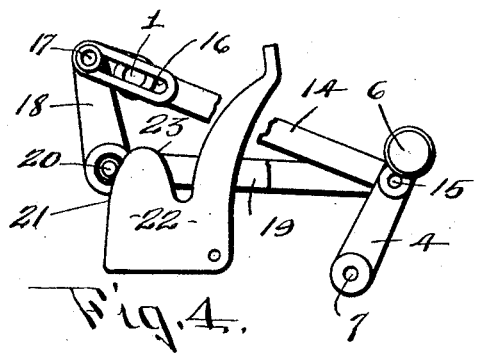
Figure 4 is a fragmentary detail view illustrating the coaction of the follower with the cam.

In operation assuming that the press head 12 is open and the motor started, the parts move from their positions indicated in dotted lines, Figure 2, first to a position where the crank 3 is in or nearly in the diametrically opposite position from that shown in dotted lines in Figure 2, thus moving the toggle links toward straight position. As the crank pin is now at the end of its power stroke and reverses its motion, no further motion will be translated to the link 14 and the pin will travel in the slot 16. While the crank 3 is travelling from its dotted line position, Figure 2, to its diametrically opposite position, it carries the link 18 and the follower 20 along the cam 22 and carries the follower finally to the lift portion 21 of the cam. The follower engages the lift portion of the cam when the link 14 approaches the end of its power stroke. Thereafter the follower rides along the lift portion and pulls the link 19 to the left finally straightening the toggle. The reverse of this operation takes place during the reverse movement of the shaft 1.

What I claim is:—

1. A mechanical movement comprising a prime mover movable about an axis and having a crank associated therewith and a driven element, a reciprocable link connecting the crank and the driven element and additional connections between the prime mover and the driven element, a cam to actuate the latter when the crank is at the end of its throw, the additional connection having a follower arranged to be brought into engagement with the cam when the crank approaches the end of its effective throw.

2. A mechanical movement comprising a prime mover movable about an axis and having a crank associated therewith and a driven element, a reciprocable link connecting the crank and the driven element and additional connections between the prime mover and the driven element to actuate the latter when the crank is at the end of its throw, said additional connections comprising a part movable with the crank and also relatively thereto and having a cam follower means connecting said part and the driven element and a cam with which the follower is carried into engagement by the crank.

3. A mechanical movement comprising a prime mover movable about an axis and a driven element, the prime mover having a crank, a link connecting the crank and the driven element, a second link pivoted to the crank and a third link connecting the second link and the driven element, the second link being carried by the crank and having a follower, and a stationary cam having a lift portion arranged to receive the follower when the crank is at the end of its throw.

4. A mechanical movement comprising a prime mover movable about an axis and having a crank associated therewith, a driven element, a link connecting the crank and the driven element, the link being connected to one of the parts it connects by a pin and slot connection and an additional connection between the prime mover and the driven element to actuate the latter when the crank is at the end of its throw, said additional connection comprising a cam having a lift portion, a second link pivoted at one end to the crank, the second link having a follower for coacting with the cam, the cam having a lift portion arranged to receive the follower when the crank is at the end of its throw and means connecting the second link and the driven element.

5. A mechanical movement comprising a prime mover movable about an axis, a driven element, connections between the prime mover and the driven element, comprising a reciprocable link connected to the prime mover by a pin and slot connection, and an additional connection between the prime mover and the driven element to additionally move the driven element in the direction of movement of said link during its power stroke, and when said link is at the end of its power stroke, said additional connections comprising a cam having a lift portion, a follower for coacting with the cam, a link connected to the follower movable with the prime mover into engagement with the cam when the link is at its power stroke and means for connecting the link and the driven element.

In testimony whereof, I have hereunto signed my name, at Syracuse, in the county of Onondaga, and in the State of New York, this 20th day of December, 1926.

ERNEST DAVIS.